Feb. 24, 1959
N. S. PARKS
2,875,397
SYNCHRONIZED VIBRATOR SYSTEM
Filed Sept. 2, 1954
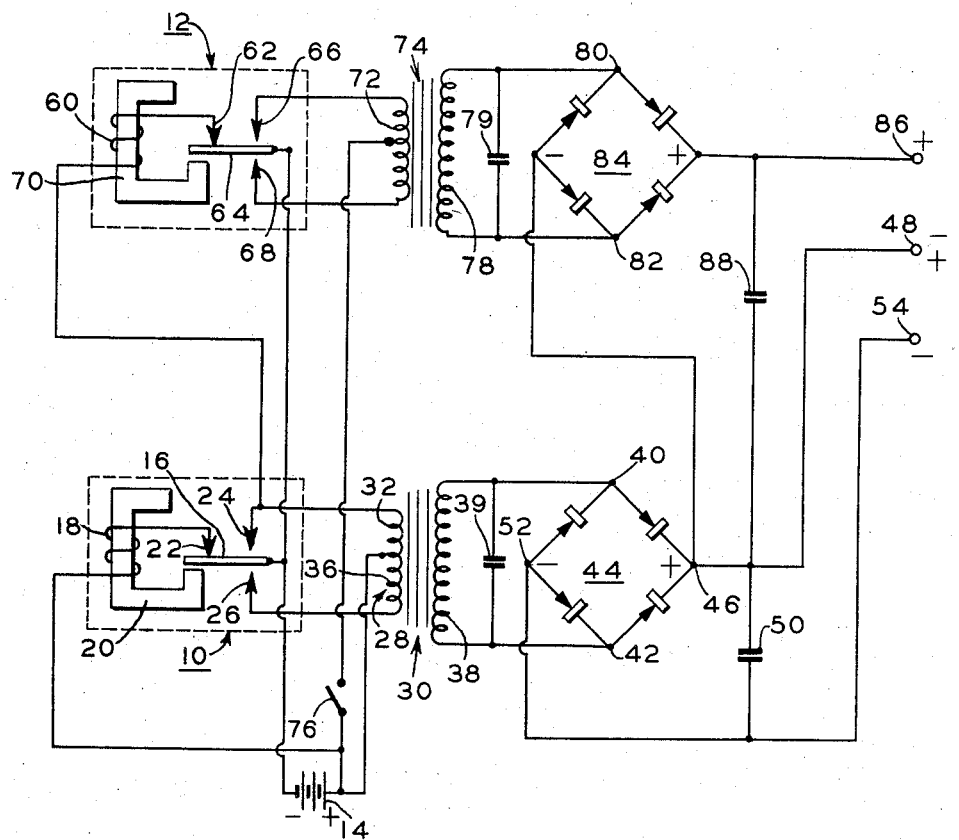
INVENTOR.
NATHAN S. PARKS
BY Arthur J. Spechler
ATTORNEY

United States Patent Office 2,875,397
Patented Feb. 24, 1959

2,875,397

SYNCHRONIZED VIBRATOR SYSTEM

Nathan S. Parks, Springfield, Pa., assignor to Radio Corporation of America, a corporation of Delaware Application September 2, 1954, Serial No. 453,917

6 Claims. (Cl. 321—49)

This invention relates generally to synchronized vibrator systems, and more particularly to a system for synchronizing the frequency and phase of the vibrating reeds of separate vibrator units energized from a common D.-C. source. While neither specifically nor exclusively related thereto, the synchronized vibrator system of the present invention is particularly applicable to power supplies for communication equipment in mobile vehicles, such as automobiles, planes, boats and the like.

The main source of electrical energy in most types of mobile vehicles, such as the automobile, plane, small boat and the like is a 6 or 12 volt storage battery. Where it is necessary or desirable to equip these vehicles with communications equipment, including a radio receiver and transmitter, it is necessary to convert the relatively low unidirectional voltage of the storage battery to a relatively higher voltage of the type utilized by the communications equipment. One of the most economical ways of accomplishing this conversion is by employing one or more vibrator units of the vibrating reed type. In order to obtain the power requirements for some mobile radio receivers and transmitters, it is necessary to use more than one vibrator unit.

Where more than one vibrator unit is operated from the same source of battery voltage, and where the vibrators are connected in a circuit with each other to provide a common output, it is necessary for the frequency of each vibrating reed to be substantially the same. If the frequencies of the vibrating reeds of the separate vibrator units differ, the output voltages of the individual vibrator units will tend to buck or reinforce each other, and thereby produce a fluctuating output voltage.

The frequency of a vibrator reed in a vibrator unit is determined by its mass and length. While the frequency of operation of commercial vibrator units is fairly well controlled by the manufacturers, the frequencies of similar units may vary by as much as ±7 cycles in about 120 cycles. Such a difference between the frequencies of two vibrator units, connected to provide a common power output, may cause a fluctuation in the output voltage of about 20 percent, as compared to the output of a system employing a pair of vibrator units whose vibrating reeds are synchronized to one frequency.

While many systems for synchronizing vibrator units, operating from a common voltage source, have been proposed, most of these draw heavy current at all times through the primary transformer winding, the ends of which are connected to the fixed contacts of the vibrator units. Since current is always drawn through this primary winding, some sparking and burning takes place at these fixed contacts and on the vibrating reed. In a communication system where the power output from one vibrator unit is sufficient to operate a radio receiver, and where the power output from at least two vibrator units is necessary to operate a transmitter, it is extremely desirable to have a synchronized vibrator system wherein the frequencies of the separate vibrating reeds are the same, but where the current in the primary transformer winding associated with one of the vibrator units may be interrupted when the transmitter is not used, so that the aforementioned sparking and burning may be prevented. In such a system, in accordance with the present invention, two separate vibrator units may have their respective vibrator reeds vibrate at the same frequency, and in phase with each other at all times, and still permit the current in one primary transformer winding to be interrupted until a maximum power output is desired.

It is, therefore, a principal object of the present invention to provide an improved synchronized vibrator system for vibrator units operating from a common source.

It is a further object of the present invention to provide an improved synchronized vibrator system that will permit the interruption of current in the primary winding of one of the output transformers, until needed, without interfering with the synchronization or phase relationship of the vibrating reeds of the separate vibrator units.

Another object of the present invention is to provide an improved system of the type described that is simple in operation and construction and highly efficient in use.

These and further objects of the present invention are attained in a synchronized vibrator system employing a pair of vibrator units of the type intended to be operated from the conventional automobile battery. Each of the vibrator units comprises a vibrating reed, a driving coil cooperating with the vibrating reed, a driver contact connected to one end of the driving coil, and a pair of fixed contacts positioned in a manner to be periodically contacted by the vibrating reed. The fixed contacts in each vibrator unit are connected to the ends of the primary transformer winding of a separate output transformer associated with each of the vibrating units. One of the vibrator units, hereinafter called the master vibrator unit, is energized by applying the battery voltage of the vehicle in series with the driver coil, the driver contact, and the vibrating reed. The second vibrator unit, hereinafter called the slave vibrator unit, is energized by the same battery voltage, the latter being applied through a series circuit comprising the vibrating reed, driver contact and driving coil of the slave vibrator unit, and a portion of the primary transformer winding associated with the master vibrating unit. The positive terminal of the battery is connected directly to the center tap of the primary transformer winding associated with the master vibrator unit to supply output energy for a receiver unit. The center tap of the primary transformer winding associated with the slave vibrator unit is connected to the positive terminal of the battery through a switch which may be maintained in an open position when the additional energy furnished by the slave vibrator unit is not required. With this arrangement the frequency of vibration of the vibrating reed of the slave vibrator unit is synchronized to the frequency and phase of the vibrating reed of the master vibrator unit at all times, but the current flow in the primary transformer winding associated with the slave vibrator unit may be interrupted until the additional energy provided thereby is needed. In this manner, it is possible, for example, to operate a radio receiver from the energy provided by the master vibrator unit, and to operate a transmitter by the energy provided by both the master and the slave vibrator units, the latter energy being substantially constant because of the synchronization of the frequencies of the master and slave vibrator units.

The novel features of the invention, as well as the invention itself, both as to its organization and method of operation, will be understood in detail from the following description when considered in connection with the accompanying drawing which is a schematic diagram of a synchronous vibrator system in accordance with the present invention.

Referring now to the drawing, there are shown a master vibrator unit 10, enclosed in a dashed rectangle, and a slave vibrator unit 12, also enclosed in a dashed rectangle, adapted to be operated from a single unidirectional voltage source 14. The vibrator units 10 and 12 are substantially similar to each other, but each may have a slightly different natural frequency of operation. The voltage source 14 may be the conventional 6 or 12 volt battery used in the conventional automobile. The vibrator 10 is of a conventional type, well known in the art, and comprises a vibrating reed 16, and a driving coil 18 that is wound around an iron core 20. A driver contact 22 is connected to one end of the driver coil 18 and is in physical contact with the vibrating reed 16 when the reed 16 is not vibrating. A pair of fixed contacts 24 and 26 are positioned on opposite sides of the vibrating reed 16 in a manner so that they will be contacted alternately by the reed 16 when the latter is vibrating. A center tapped primary winding 28 of an output transformer 30 has its ends connected to the fixed contacts 24 and 26, respectively, of the master vibrator unit 10.

The voltage source 14 is connected directly in series with the driving coil 18, the driver contact 22, and the vibrating reed 16 of the master vibrator unit 10. This series circuit may include a switch (not shown) for starting and stopping the vibrating unit 10.

It will now be understood that current flowing through the driving coil 18 will magnetize the iron core 20 and pull the vibrating reed 16 away from the driver contact 22. The vibrating reed 16 will now contact the fixed contact 26. Current will now cease to flow in the driving coil 18 and the magnetic field set up in the iron core 20 will decay. The reed 16 will now tend to return to its original position but the energy of its motion will carry it to the fixed contact 24. In doing so, the reed 16 again makes contact with the driver contact 22. Thus, the reed 16 of the master vibrator unit 10 will continue to vibrate between the fixed contacts 24 and 26 at a frequency determined by its mass and length.

The positive terminal of the voltage source 14 is connected to the center tap of the primary winding 28 of the transformer 30. Since the negative terminal of the voltage source 14 is connected to the vibrating reed 16, it will be noted that current will flow through the upper half 32 of the primary winding 28 when the reed 16 touches the fixed contact 24, and current will flow through the lower half 36 of the primary winding 28 when the reed 16 touches the fixed contact 26. Current flowing alternately in opposite directions in the primary winding 28 of the transformer 30 will provide a transformed A.-C. voltage across a secondary winding 38 of the output transformer 30. The ends of the secondary winding 38 of the output transformer 30 are connected across a buffer capacitor 39, and to the input terminals 40 and 42, respectively, of a rectifier 44, such as a full wave bridge rectifier of conventional design. A positive output terminal 46 of the rectifier 44 is connected to an output terminal 48 and to one side of a filter capacitor 50. A negative output terminal 52 of the rectifier 44 is connected to an output terminal 54 and to the other side of the filter capacitor 50. Thus, it will be understood that the relatively low unidirectional voltage of the voltage source 14, say about 6 volts, may be converted into an A.-C. voltage of about 220 volts across the input terminals 40 and 42 to the rectifier 44, and to a unidirectional voltage of about 200 volts across output terminals 48 and 54.

Where a greater output voltage is required, and/or a higher current capacity is required, the slave vibrator unit 12 is connected in circuit with the master vibrator unit 10, in accordance with the present invention. The vibrator unit 12 is similar to the vibrator unit 10 and comprises a driving coil 60 having one end connected to a driving contact 62 and the other end connected to the fixed contact 24 of the master vibrator unit 10. A vibrating reed 64 is adapted to vibrate between the fixed contacts 66 and 68. The driving coil 60 is wound around the iron core 70. A center tapped primary winding 72 of an output transformer 74 has its ends connected between the fixed contacts 66 and 68. The center tap of the primary winding 72 is connected to the positive terminal of the voltage source 14 through a switch 76, for the purpose hereinafter appearing. A secondary winding 78 of the output transformer 74 is connected across a buffer capacitor 79, and across the input terminals 80 and 82 of a rectifier 84, such as a full wave bridge type rectifier similar to the rectifier 44. A positive output terminal of the rectifier 84 is connected to a positive output terminal 86 and to one side of a filter capacitor 88. The negative output terminal of the rectifier 84 is connected to the output terminal 48, and to the other side of the capacitor 88.

The slave vibrator unit 12 is energized from the voltage source 14 through the series circuit comprising the upper half 32 of the center tapped primary winding 28, of the output transformer 30, the driving coil 60, the driver contact 62 and the vibrator reed 64.

The operation of the synchronized vibrator system, in accordance with the present invention, will now be described. Let it be assumed that the unidirectional voltage between the output terminals 48 and 52 of the system is to be utilized by one utilization circuit, such as a radio receiver, and that the voltage between the output terminals 86 and 54 is to be used by a second utilization circuit, such as a radio transmitter. Let it also be assumed that the unidirectional voltage across the output terminals 86 and 54 is desired only when the transmitter is to be operated.

Since the driving coil 18 of the master vibrator unit 10 is energized directly by the voltage source 14, it will cause the vibrating reed 16 of the vibrator unit 10 to contact the fixed contacts 24 and 26 alternately, and thereby cause current to flow alternately in the halves 32 and 36 of the primary winding 28. It will be noted that when current flows in the half 36 of the primary winding 28, a voltage is induced in the half 32 of the primary winding 28 of the autotransformer principle. Since the driving coil 60 of the slave vibrator unit 12 is energized from the voltage source 14 through the upper half 32 of the primary winding 28, it will be seen that the voltage supplied across the driver coil 60 of the slave vibrator unit 12 will be the voltage of the voltage source 14 and the induced voltage in the upper half 32 of the primary winding 28 of the output transformer 30 when the reed 16 of the master vibrator unit 10 contacts the fixed contact 26. In this manner, when the reed 16 of the vibrator unit 10 is moving downwardly (looking at the figure) and touches the contact 26, the driving coil 60 will be energized by a voltage equal to the combined voltage of the voltage source 14 and the induced voltage in the upper half 32 of the primary winding 28. The reed 64 of the slave vibrator unit 12, consequently, will also be driven downward by the magnetic pull of the iron core 70 toward the lower fixed contact 68. Thus, the vibrating reed 16 of the master vibrator unit 10 and the reed 64 of the slave vibrator unit 12 are energized at substantially the same time and in the same direction. When the vibrating reed 16 swings back to contact the upper contact 24 the voltage applied across the driving coil 60 of the vibrator unit 12 will be zero. Thus, it is also seen that every time the vibrating reed 16 of the master vibrator unit 10 contacts its lower contact 26 the reed 64 is also pulled in the same direction by a voltage greater than the voltage source 14.

Since the halves 32 and 36 of the primary winding 28 have substantially the same number of turns, the voltage induced in the upper half 32 by autotransformer action, is substantially equal to the voltage of the voltage source 14. Consequently, the voltage applied across the driving coil 60 of the slave vibrator unit 12 is substantially twice that applied across the driving coil 18 of the master vibrator unit 10. From the foregoing, it is obvious that the reed 64 would be 180° out of phase with the reed 16 if the driving coil 60 were connected to the fixed contact 26 instead of the fixed contact 24.

In accordance with the circuitry thus far shown and described it will be understood that there is always an output unidirectional voltage across the output terminals 48 and 54. This follows from the fact that current flows alternately in the halves 32 and 36 of the primary winding 28 of the output transformer 30. If it is desired to operate a circuit requiring the voltage across the output terminals 86 and 54, which is substantially twice the voltage between the output terminals 48 and 54, the switch 76 is closed. Current will now flow from the voltage source 14 alternately in the halves of the center tapped primary winding 72, of the transformer 74, as a consequence of the vibrating reed 64 of the slave vibrator unit 12 alternately contacting the fixed contacts 66 and 68. The transformer A.-C. voltage across the secondary 78 of the output transformer 74 is rectified by the rectifier 84 and applied across the terminals 86 and 48. When it is necessary or desirable to operate a utilization circuit (not shown) by the voltage between the terminals 86 and 48 and/or the terminals 86 and 54, the switch 76 is closed and, consequently, current will flow in the primary winding 72 of the output transformer 74. With this arrangement it will be seen that with the switch 76 in an open position there will be no sparking, and consequently no burning, between the fixed contacts 66 and 68 and the vibrator reed 64 of the slave vibrator unit 12.

Thus, there has been shown and described herein a synchronized vibrator system, in accordance with the objects of the present invention, comprising a master vibrator unit and a slave vibrator unit. The frequency of the vibrating reed of the master vibrator unit determines the frequency of a series of pulses that is applied to the energizing circuit of the slave vibrator unit for the purpose of synchronizing the frequency and phase of the vibrating reed of the slave vibrator unit to that of the master vibrator unit. Means are also provided to prevent sparking and burning at the fixed contacts of the slave vibrator unit, without interfering with the synchronization of the vibrator system, when only the power output from the master vibrator unit is required.

What is claimed is:

1. A synchronized vibrator system comprising a first and a second vibrator unit each having a driving coil, a vibrating reed cooperating with said coil, a driver contact connected to one end of said coil and a pair of fixed contacts positioned to be contacted periodically by said vibrating reed, a first center tapped winding connected between said pair of fixed contacts of said first unit, means to connect a source of D.-C. voltage directly in series with said driving coil, said driver contact and said vibrating reed of said first unit to energize said driving coil of said first unit by said D.-C. voltage source only, means to connect said source in series with said driving coil, said driver contact and said vibrating reed of said second unit through a portion of said first winding including the center tap thereof, a second center tapped winding connected between said pair of fixed contacts of said second unit, a switch, and means connecting the center tap of said first center tapped winding to the center tap of said second center tapped winding through said switch only.

2. A synchronized vibrator system comprising a first and a second vibrator unit each having a driving coil, a vibrating reed cooperating with said coil, a driver contact connected to one end of said coil and a pair of fixed contacts positioned to be contacted periodically by said vibrating reed, a first center tapped winding connected between said pair of fixed contacts of said first unit, means to connect a source of D.-C. voltage directly in series with said driving coil, said driver contact and said vibrating reed of said first unit to energize said driving coil of said first unit by said D.-C. voltage source only, means to connect said source in series with said driving coil, said driver contact and said vibrating reed of said second unit through a portion of said first winding, said last-mentioned means comprising a connection from the other end of said driving coil of said second unit to one of said pair of fixed contacts of said first unit and a connection from said source to the center tap of said first winding, a second center tapped winding connected between said pair of fixed contacts of said second unit, a switch, and means connecting the center tap of said first winding to the center tap of said second winding through said switch.

3. A synchronized vibrator system comprising a first and a second vibrator unit each having a driving coil, a vibrating reed cooperating with said coil, a driver contact connected to one end of said coil and a pair of fixed contacts positioned to be contacted periodically by said vibrating reed, a first center tapped winding connected between said pair of fixed contacts of said first vibrator unit, a second center tapped winding connected between said pair of fixed contacts of said second vibrator unit, means to connect a source of D.-C. voltage directly in series with said driving coil, said driver contact and said vibrating reed of said first unit to energize said driving coil of said first unit by said D.-C. voltage source only, means to connect said source in series with said driving coil, said driver contact and said vibrating reed of said second unit through a portion of said first winding including the center tap thereof, and a switch connected between said source and the center tap of said second winding to control current therethrough at will, said center tap of said first winding being connected to said center tap of said second winding through said switch.

4. In a synchronized vibrator system of the type comprising a master vibrator unit and a slave vibrator unit, each of said units comprising a driving coil, a vibrating reed cooperating with said coil, a driver contact connected to one end of said coil and a pair of fixed contacts positioned to be contacted periodically by said vibrating reed; a first center tapped winding connected between said pair of fixed contacts of said master unit, means to connect a source of D.-C. voltage directly between the other end of said coil and said vibrating reed of said master unit to energize said driving coil of said master unit by said D.-C. voltage source only, and means to apply said D.-C. source in series with said driving coil, said driver contact and said vibrating reed of said slave unit through a portion of said winding including the center tap thereof, a second center tapped winding connected between said pair of fixed contacts of said slave unit, a switch, and means connecting the center tap of said first winding to the center tap of said second winding through said switch.

5. In a synchronized vibrator system of the type comprising a master vibrator unit and a slave vibrator unit, each of said units comprising a driving coil, a vibrating reed cooperating with said coil, a driver contact connected to one end of said coil and a pair of fixed contacts positioned to be contacted periodically by said vibrating reed; a first center tapped winding connected between said pair of fixed contacts of said master unit, means to connect a source of D.-C. voltage directly between the other end of said coil and said vibrating reed of said master unit to energize said driving coil of said master unit by said D.-C. voltage source only, means to apply said D.-C. source in series with said driving coil, said driver contact and said vibrating reed of said slave unit through a portion of said first winding, said last-mentioned means comprising a connection from said D.-C. source to the center tap of said first winding and a connection from one end of said portion of said first winding to the other end of said driving coil of said slave unit, a second center tapped winding connected between said pair of fixed contacts of said slave unit, a switch and means connecting the center tap of said first winding to the center tap of said second winding through said switch.

6. In a synchronized vibrator system of the type comprising a master vibrator unit and a slave vibrator unit, each of said units comprising a driving coil, a vibrating reed cooperating with said coil, a driver contact connected to one end of said coil and a pair of fixed contacts positioned to be contacted periodically by said vibrating reed; a first center tapped winding connected between said pair of fixed contacts of said master unit, a second center tapped winding connected between said pair of fixed contacts of said slave unit, means to apply a source of D.-C. voltage between the other end of said driving coil and said vibrating reed of said master unit to energize said driving coil of said master unit by said D.-C. voltage source only, means to apply said D.-C. source between the other end of said driving coil and said vibrating reed of said slave unit through a portion of said first winding including the center tap thereof, a switch, means to connect said D.-C. source to the center tap of said second winding through said switch, said second winding being energized only when said switch is closed, and said driving coils of said master and slave units being operative independently of said switch.

References Cited in the file of this patent
UNITED STATES PATENTS

| | | |
|---|---|---|
| 2,265,717 | Bedford | Dec. 9, 1941 |
| 2,337,207 | Nicholson | Dec. 21, 1943 |
| 2,439,107 | Slater | Apr. 6, 1948 |
| 2,443,675 | Brown | June 22, 1948 |
| 2,498,893 | Mas | Feb. 28, 1950 |
| 2,544,332 | Lee | Mar. 6, 1951 |

FOREIGN PATENTS

| | | |
|---|---|---|
| 574,428 | Great Britain | Jan. 4, 1946 |